United States Patent

Kawakami

[11] Patent Number: 6,125,745
[45] Date of Patent: Oct. 3, 2000

[54] ROOT REMOVER FOR BEAN SPROUTS

[75] Inventor: Sanji Kawakami, Tokyo, Japan

[73] Assignee: Daisey Machinery Co., Ltd., Tsurugashima, Japan

[21] Appl. No.: 09/462,487

[22] PCT Filed: May 19, 1998

[86] PCT No.: PCT/JP98/02193

§ 371 Date: Jan. 19, 2000

§ 102(e) Date: Jan. 19, 2000

[87] PCT Pub. No.: WO99/59435

PCT Pub. Date: Nov. 25, 1999

[51] Int. Cl.[7] .............................. A23N 15/00; A23N 15/12
[52] U.S. Cl. ................................. 99/643; 99/546; 99/635; 99/637; 99/641
[58] Field of Search .............................. 99/546, 635–643, 99/584, 588, 443 C; 426/481–485

[56] References Cited

U.S. PATENT DOCUMENTS

| | | | |
|---|---|---|---|
| 4,367,675 | 1/1983 | Boots | 99/546 |
| 4,448,118 | 5/1984 | Kunz | 99/624 |
| 4,509,414 | 4/1985 | Chiu et al. | 99/585 |
| 4,685,388 | 8/1987 | Chen | 99/641 |
| 4,981,073 | 1/1991 | Zittel | 99/636 |
| 5,144,887 | 9/1992 | Mietzel | 99/636 |
| 5,752,435 | 5/1998 | Wai | 99/567 |
| 5,802,965 | 9/1998 | Lin | 99/546 X |

FOREIGN PATENT DOCUMENTS

| | | |
|---|---|---|
| 8-56634 | 3/1996 | Japan . |
| 8-506729 | 7/1996 | Japan . |

*Primary Examiner*—Timothy Simone
*Attorney, Agent, or Firm*—Oblon, Spivak, McClelland, Maier & Neustadt, P.C.

[57] ABSTRACT

Sprouting beans roots removing apparatus cuts and removes roots of sprouting beans, as harvested, efficiently. A plurality of projections, each having at its upper face angular portion, are fitted to upper surface of base plate with predetermined space being maintained between each of them. Roots cutting member having angular portion is arranged above the base plate with predetermined space being maintained from upper surface of the projections. The base plate is moved in certain velocity and the roots cutting member repeats faster movements and stops, thereby the sprouting beans have their roots cut and removed by and between both the angular portions of the projection and the roots cutting member.

6 Claims, 3 Drawing Sheets

ROOT REMOVER FOR BEAN SPROUTS

BACKGROUND OF THE INVENTION

1. Field of the Invention

The present invention relates to a sprouting bean roots removing apparatus for removing roots of sprouting beans as harvested for refinement thereof.

2. Description of the Prior Art

As sprouting beans as harvested have roots and these roots are often slightly colored, their existence in the sprouting beans as commercial goods is sometimes deemed an eyesore thing. Also, the sprouting beans deteriorate quicker in the root portion, hence it has been long desired to remove roots of the sprouting beans as harvested.

However, it is extremely difficult to remove roots only of the sprouting beans having various shapes. Especially if a strong force is added on the sprouting beans as harvested for removing roots thereof, it will hurt the sprouting beans or make them prone to deteriorate. For this reason, it has been hardly done conventionally to remove roots of the sprouting beans. That is, it has been so done conventionally that the sprouting beans as harvested are immersed in a water tank which is filled with a large amount of water and while foreign matters, such as hulls or dusts, attaching to the sprouting beans are being washed off to be removed, some of the roots are removed together incidentally.

In some cases, it is also done to remove roots of the sprouting beans manually but this requires an extremely troublesome and time-consuming work and it has been almost impossible to remove roots of the sprouting beans finely to a satisfactory extent.

SUMMARY OF THE INVENTION

It is therefore an object of the present invention to provide an apparatus which is able to remove roots of sprouting beans as harvested to a satisfactory state.

It is also an object of the present invention to provide a sprouting bean roots removing apparatus which neither hurts sprouting beans as commercial products nor makes them prone to deteriorate.

In order to achieve said objects, the present invention provides a sprouting bean roots removing apparatus, characterized in comprising a base plate on which the sprouting beans are placed to be conveyed, said base plate being formed thereon with a projection which has at its upper face an angular portion and elongates in a cross machine direction which is defined a direction crossing a moving direction of said base plate, and a roots cutting member which is arranged above said base plate with a predetermined small space being maintained from said base plate, has at its lower face an angular portion and elongates in the cross machine direction, and characterized in being constructed such that relative movements are given between said base plate and roots cutting member so that sprouting bean roots may be cut by and between mutually opposing said angular portions of said projection and roots cutting member.

The mentioned base plate may be constructed as a conveyor which is moved in one direction and is fitted to its upper surface with the projection consisting of a plurality of first plate-like members arranged with a predetermined space being maintained between each of said first plate-like members. Also, the mentioned roots cutting member may be constructed by a plurality of second plate-like members arranged with a predetermined space being maintained between each of said second plate-like members.

Further, the mentioned roots cutting member may be constructed so as to repeat movements and stops alternately, wherein said movements are in the same direction as the moving direction of the base plate and in a faster velocity than a moving velocity of the base plate.

In the apparatus so constructed, when the sprouting beans are placed on the base plate to be conveyed, as they are wet and their root portions are slender and flexible, the wet root portions come in a state to stick to the upper surface of the base plate by the surface tension of water.

In the apparatus of the present invention, while the sprouting beans are being conveyed with their root portions sticking to the upper surface of the base plate, the roots cutting member is given relative movements thereabove and head portions of the sprouting beans are displaced by the roots cutting member. On the other hand, the root portions want to move along with the base plate, that is, to remain on the moving base plate, thereby when the mutually opposing angular portions of the projection and the roots cutting member cross with each other, the root portions come to be cut by and between these two angular portions. In this way, the sprouting beans may have their root portions cut and removed effectively.

The mentioned functions are shown schematically in FIG. 3 and description will be made further thereon.

In FIG. 3(a), the base plate 1 is formed thereon with the projection 5 which has at its upper face the angular portion 2 and elongates in the cross machine direction. Sprouting bean S placed on the base plate 1 is being conveyed to the left hand direction in the figure. The roots cutting member 4 above the base plate 1 has at its lower face the angular portion 3 and is moving to the left hand direction in the figure in the faster velocity than the moving velocity of the base plate 1. Thus, the sprouting bean S on the base plate 1 is moved to the left hand direction on the base plate 1, as shown in FIG. 3(b), by the roots cutting member 4 which is moving in the faster velocity.

The wet root portion of the sprouting bean S sticks to the surface of the base plate 1, so that such situation comes that the root portion is going to cross over the projection 5 on the base plate 1 later than the head portion and stalk portion of the sprouting bean S, as shown in FIG. 3(c). In this state, when the angular portion 2 of the projection 5 and the angular portion 3 of the roots cutting member 4 cross with each other, the root portion is cut to be separated by and between both the angular portions 2, 3, as shown in FIG. 3(d).

The root portion so cut remains sticking to the surface of the base plate 1 and moves together with the base plate 1, and when the base plate 1 is washed by water downstream, the root portion is washed off the surface of the base plate 1. Thus, according to the apparatus of the present invention, the sprouting beans can be removed of their roots by the principle as mentioned above.

DESCRIPTION OF THE PREFERRED EMBODIMENTS

Herebelow, a sprouting bean roots removing apparatus of one embodiment according to the present invention will be described concretely with reference to appended figures.

Figure 1:
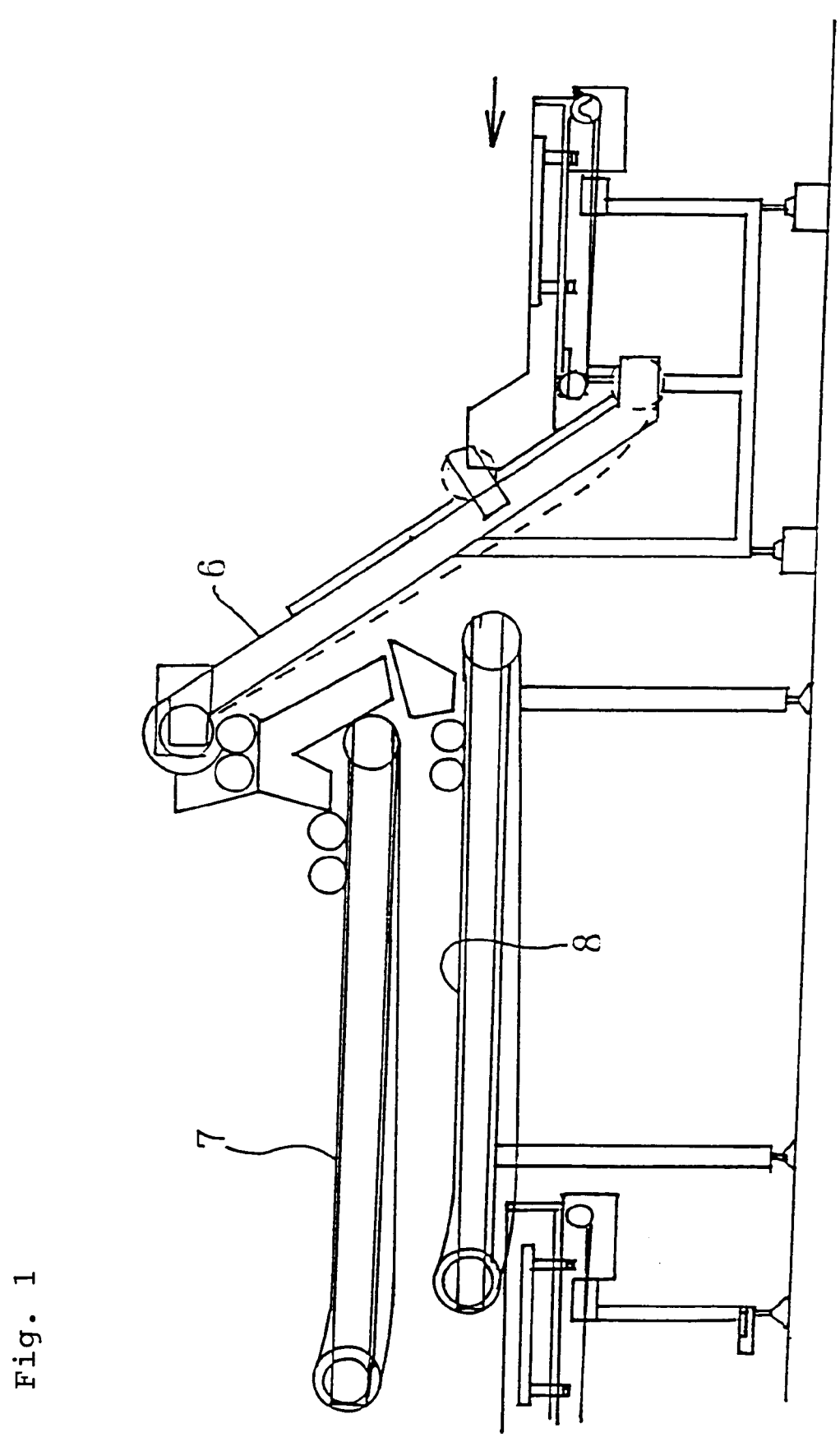
FIG. 1 is an entire side view showing a construction of a sprouting bean roots removing apparatus of one embodiment according to the present invention.
Figure 2:
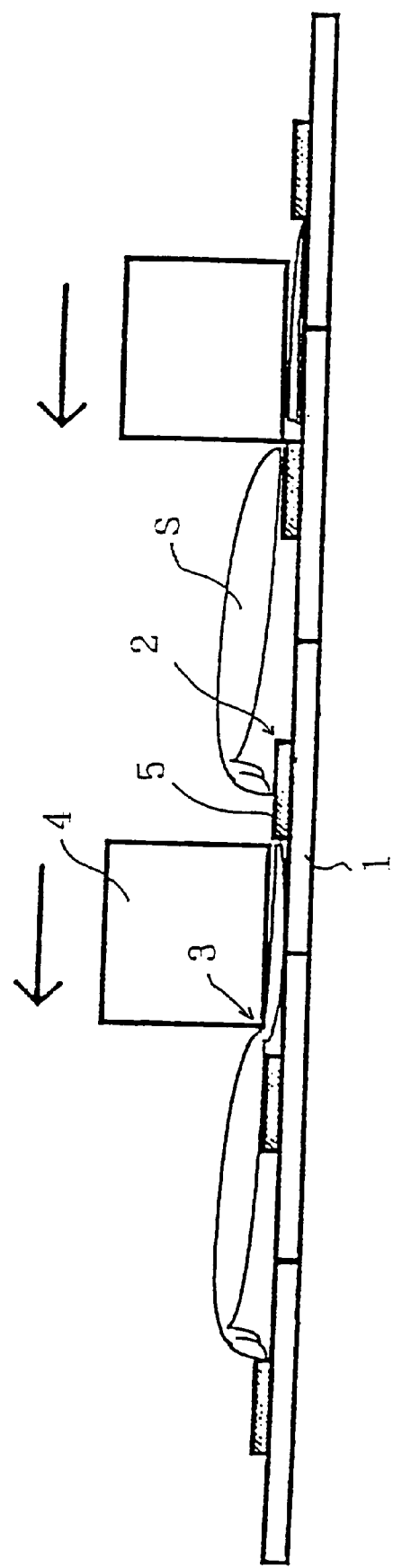
FIG. 2 is an enlarged explanatory view of a base plate and roots cutting members used in the apparatus of FIG. 1.

FIG. 1 is an entire side view showing a construction of the sprouting bean roots removing apparatus of one embodiment according to the present invention, and FIG. 2 is an enlarged explanatory view of a base plate and roots cutting members used in the apparatus of FIG. 1.

As shown in FIGS. 1 and 2, sprouting beans fed in arrow direction of FIG. 1 are scraped by a scraping conveyor 6 to be sent upward and are then separated into two lines to be supplied onto two conveyors 7, 8. Each of the conveyors 7, 8 has a base plate 1, as shown in FIG. 2, and is substantially the same to each other. Structure and function of the conveyors 7, 8 will be described below with reference to FIG. 2.

On an upper surface of the base plate 1, there are fitted a plurality of projections 5 with a predetermined space being maintained between each of them in the machine direction, each of the projections 5 having a rectangular portion 2 and elongating in the cross machine direction, wherein the machine direction is defined a direction in which the base plate 1 moves and the cross machine direction is defined a direction crossing the machine direction. Further, above the base plate 1 and with a predetermined space being maintained from an upper surface of each of the projections 5, there are arranged a plurality of roots cutting members 4 with a predetermined space being maintained between each of them in the machine direction. Each of the roots cutting members 4 has a rectangular portion 3.

Here, where a moving velocity of the base plate 1 is, for example, 200 mm/sec, that of the roots cutting member 4 is 400 mm/sec. Also, a thickness of the projection 5 is 1 mm and it is so arranged that a space of 1 mm is maintained between the upper surface of the projection 5 and a lower surface of the roots cutting member 4. The mentioned dimensions are examples only and appropriate dimensions are to be selected according to types of the sprouting beans, handling velocities thereof, etc.

The roots cutting member 4 is so constructed that movements in the velocity of 400 mm/sec and stops are repeated with predetermined time intervals therebetween. When the roots cutting member 4 stops, the sprouting beans on the base plate 1 are prevented from moving along with the base plate 1 by the roots cutting member 4. Thus, the sprouting beans on the base plate 1 come in a state that they are moved on the base plate 1 relatively toward the right hand direction in the figure by the roots cutting member 4.

Figure 3:
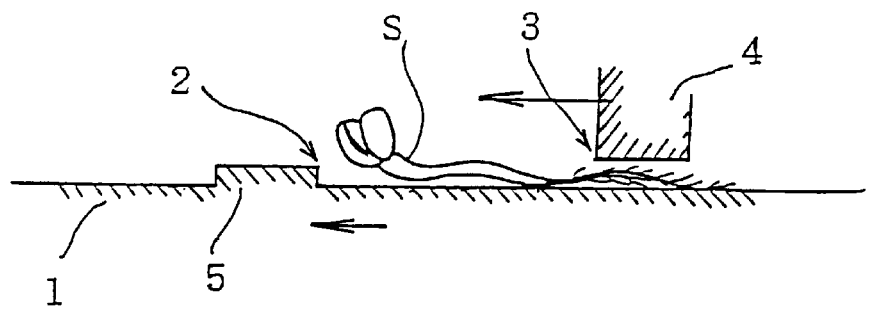
FIG. 3 is a schematic explanatory view showing stepwise a sprouting bean root cutting principle applied to the apparatus of the present invention.
Figure 3:
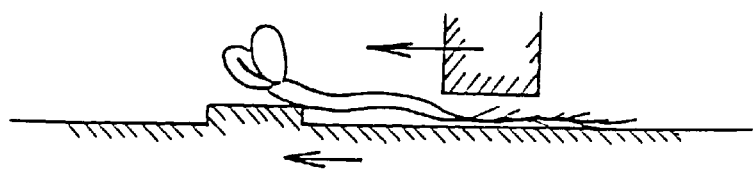
Figure 3:
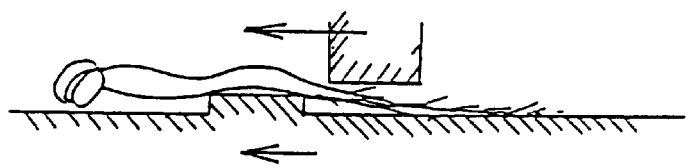
Figure 3:
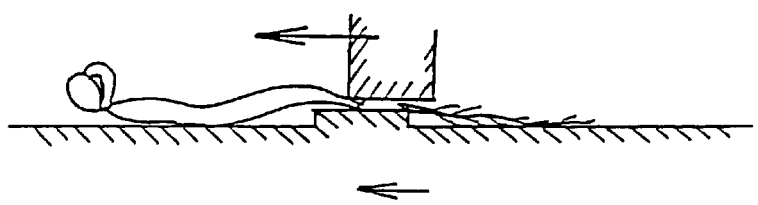

Subsequently, when the roots cutting member 4 is moved in the machine direction in the velocity of 400 mm/sec, the roots cutting member 4 comes in a state that it is moved in the machine direction in the velocity of 200 mm/sec relative to the base plate 1, as shown in FIG. 3.

Thus, when the roots cutting member 4 so moves and stops, the projection 5 and the roots cutting member 4 cross with each other and cutting of sprouting bean roots is done, as described with respect to FIG. 3. By such movements and stops of the roots cutting member 4, the sprouting beans on the base plate 1 have their roots cut by the right and left rectangular portions of the projection 5 and the roots cutting member 4, hence roots removal can be done efficiently.

It is to be noted that although the above apparatus has been described based on the illustration showing only one single piece of the sprouting beans, there are actually a multiplicity of sprouting beans placed on the base plate 1 and said cutting and removing action of the roots is done with respect to every single piece of the multiplicity of sprouting beans.

It is understood that although the invention has been described with respect to the one embodiment as illustrated, the invention is not limited thereto but may be added naturally with various modifications within the scope of the appended claims.

For example, while the mentioned embodiment has both the angular portions formed in the rectangular shape, the roots cutting member 4, for example, may be formed in a triangular cross sectional shape having an acute angular portion.

Also, while the mentioned embodiment has the two lines of the conveyors 7, 8 for cutting and removing the roots of the sprouting beans scraped by the scraping conveyor 6, the number of the lines may be three or more, or even one.

In the sprouting bean roots removing apparatus of the present invention as described above, there are provided the base plate and the roots cutting member, said base plate being formed thereon with the projection having at its upper face, the angular portion and said roots cutting member being arranged above the base plate with a predetermined space being maintained from the base plate and having at its lower face the angular portion, and relative movements are given between the base plate and the roots cutting member, thereby the sprouting bean roots can be cut and separated by and between both the angular portions.

In the present invention as mentioned above, there is needed no means of special or complicated construction and yet the sprouting beans as harvested, which have various shapes and have heretofore been hardly removed of their roots, can be removed of the roots effectively without the sprouting beans being hurt. Moreover, the apparatus of the present invention is of a simple structure having a long life and the maintenance and inspection thereof are very much facilitated.

What is claimed is:

1. A sprouting bean roots removing apparatus for removing roots of sprouting beans as harvested, comprising a base plate on which the sprouting beans are placed to be conveyed, said base plate being formed thereon with a projection which has at its upper face an angular portion and elongates in a cross machine direction which is defined a direction crossing a moving direction of said base plate, and a roots cutting member which is arranged above said base plate with a predetermined small space being maintained from said base plate, has at its lower face an angular portion and elongates in the cross machine direction, and being constructed such that relative movements are given between said base plate and roots cutting member so that sprouting bean roots may be cut by and between mutually opposing said angular portions of said projection and roots cutting member.

2. A sprouting bean roots removing apparatus as claimed in claim 1, wherein said base plate is a conveyor which is moved in one direction, said projection is a plurality of first plate-like members fitted to an upper surface of said conveyor with a predetermined space being maintained between each of said first plate-like members and said roots cutting member is a plurality of second plate-like members arranged with a predetermined space being maintained between each of said second plate-like members.

3. A sprouting bean roots removing apparatus as claimed in claim 1, wherein said roots cutting member repeats movements and stops alternately and said movements are in the same direction as the moving direction of said base plate and in a faster velocity than a moving velocity of said base plate.

4. A sprouting bean roots removing apparatus as claimed in claim 1, wherein a thickness of said projection is 1 mm and a space of 1 mm is maintained between an upper surface of said projection and a lower surface of said roots cutting member.

5. A sprouting bean roots removing apparatus as claimed in claim 2, wherein said roots cutting member repeats movements and stops alternately and said movements are in the same direction as the moving direction of said base plate and in a faster velocity than a moving velocity of said base plate.

6. A sprouting bean roots removing apparatus as claimed in claim 2, wherein a thickness of said projection is 1 mm and a space of 1 mm is maintained between an upper surface of said projection and a lower surface of said roots cutting member.

\* \* \* \* \*